United States Patent
Wagner et al.

(10) Patent No.: US 7,610,545 B2
(45) Date of Patent: Oct. 27, 2009

(54) ANNOTATIONS FOR TRACKING PROVENANCE

(75) Inventors: Tim A Wagner, Seattle, WA (US); Gary Horen, Seattle, WA (US)

(73) Assignee: BEA Systems, Inc., San Jose, CA (US)

( * ) Notice: Subject to any disclaimer, the term of this patent is extended or adjusted under 35 U.S.C. 154(b) by 436 days.

(21) Appl. No.: 11/145,605

(22) Filed: Jun. 6, 2005

(65) Prior Publication Data

US 2006/0277523 A1 Dec. 7, 2006

(51) Int. Cl.
*G06F 17/00* (2006.01)
(52) U.S. Cl. ..................................... 715/200
(58) Field of Classification Search ................ 715/500, 715/512, 200, 230, 231–232
See application file for complete search history.

(56) References Cited

U.S. PATENT DOCUMENTS

| | | | | | |
|---|---|---|---|---|---|
| 6,052,693 | A * | 4/2000 | Smith et al. | ............... | 707/104.1 |
| 6,237,096 | B1 * | 5/2001 | Bisbee et al. | ............... | 713/178 |
| 6,317,708 | B1 * | 11/2001 | Witbrock et al. | ............... | 704/9 |
| 6,367,013 | B1 * | 4/2002 | Bisbee et al. | ............... | 713/178 |
| 7,257,769 | B2 * | 8/2007 | Caspi | ........................ | 715/233 |
| 7,432,938 | B1 * | 10/2008 | Reuter et al. | ............... | 345/619 |
| 2002/0129057 | A1 * | 9/2002 | Spielberg | .................... | 707/512 |
| 2002/0184401 | A1 * | 12/2002 | Kadel et al. | ................. | 709/315 |
| 2004/0125988 | A1 * | 7/2004 | Coetzee et al. | ............. | 382/112 |
| 2004/0236730 | A1 * | 11/2004 | Frank | ............................. | 707/3 |
| 2004/0250201 | A1 * | 12/2004 | Caspi | ........................ | 715/512 |
| 2005/0050000 | A1 * | 3/2005 | Kwok et al. | .................... | 707/1 |
| 2006/0080369 | A1 * | 4/2006 | Razdow et al. | ............... | 707/204 |
| 2006/0101285 | A1 * | 5/2006 | Chen et al. | .................... | 713/193 |
| 2006/0136483 | A1 * | 6/2006 | Nguyen et al. | .............. | 707/102 |
| 2006/0149759 | A1 * | 7/2006 | Bird et al. | .................... | 707/100 |
| 2006/0167905 | A1 * | 7/2006 | Liu et al. | .................... | 707/100 |
| 2006/0206503 | A1 * | 9/2006 | Gaurav et al. | ................ | 707/100 |
| 2006/0282778 | A1 * | 12/2006 | Barsness et al. | ............. | 715/726 |
| 2007/0038649 | A1 * | 2/2007 | Agrawal et al. | ............. | 707/100 |
| 2007/0078873 | A1 * | 4/2007 | Avinash et al. | .............. | 707/101 |
| 2007/0083529 | A1 * | 4/2007 | Agrawal et al. | ............. | 707/100 |
| 2007/0100858 | A1 * | 5/2007 | Milstead et al. | ............. | 707/101 |
| 2007/0220486 | A1 * | 9/2007 | Lammel et al. | ............. | 717/114 |

OTHER PUBLICATIONS

Power et al., Program Annotation in XML: A Parse-tree based Approach, IEEE 2002, pp. 1-9.*
Baroni et al., Finding Where to Apply Object-Relational Database Schema Refactorings: An Ontology-guided Approach, Google 2005, pp. 1-8.*
Aguiar et al., JavaML 2.0: Enriching the Markup Language for Java Source Code, Google 2004, pp. 1-12.*
Tan, Research Problems in Data Provenance, Bulletin of the IEEE 2004, pp. 1-8.*
Carroll et al., Named Graphs, Provenance and Trust, ACM May 2005, pp. 613-622.*
Myers et al., Multi-Scale Science: Supporting Emerging Practice with Semantically Derived Provenance, Google, ISWC 2003 Workshop, pp. 1-6.*
Welty et al., Tracking Information extraction from intelligence documents, Google, 2005 International Conference, pp. 1-6.*
Zhao et al., Annotating, Linking and Browsing Provenance Logs for e-Science, Google 2003, pp. 1-6.*

* cited by examiner

*Primary Examiner*—Cong-Lac Huynh
(74) *Attorney, Agent, or Firm*—Squire, Sanders & Dempsey, L.L.P.

(57) ABSTRACT

A system, method and media for automatically relating documents, comprising selecting a first element in a first document; selecting a second element based on the first element; annotating the second element in a second document with an annotation and wherein the annotation refers to the first element. This abstract is not intended to be a complete description of, or limit the scope of, the invention. Other features, aspects and objects of the invention can be obtained from a review of the specification, the figures and the claims.

26 Claims, 8 Drawing Sheets

```
<xs:schema
    xmlns:xs="http://www.w3.org/2001/XMLSchema"
    xmlns:po="http://openuri.org/easypo"
    targetNamespace="http://openuri.org/easypo"
    elementFormDefault="qualified">

<xs:element name="purchase-order">
      <xs:complexType>
        <xs:sequence>
          <xs:element name="customer" type="po:customer"/>
          <xs:element name="date" type="xs:dateTime"/>
          <xs:element name="line-item" type="po:line-item" minOccurs="0" maxOccurs="unbounded"/>
          <xs:element name="shipper" type="po:shipper" minOccurs="0" maxOccurs="1"/>
        </xs:sequence>
      </xs:complexType>
    </xs:element>

<xs:complexType name="customer">
      <xs:sequence>
        <xs:element name="name" type="xs:string"/>
        <xs:element name="address" type="xs:string"/>
      </xs:sequence>
      <xs:attribute name="age" type="xs:int"/>
    </xs:complexType>

<xs:complexType name="line-item">
      <xs:sequence>
        <xs:element name="description" type="xs:string"/>
        <xs:element name="per-unit-ounces" type="xs:decimal"/>
        <xs:element name="price" type="xs:decimal"/>
        <xs:element name="quantity" type="xs:integer"/>
      </xs:sequence>
    </xs:complexType>

<xs:complexType name="shipper">
      <xs:sequence>
        <xs:element name="name" type="xs:string"/>
        <xs:element name="per-ounce-rate" type="xs:decimal"/>
      </xs:sequence>
    </xs:complexType>

</xs:schema>
```

- 200: purchase-order element
- 202: customer complexType
- 204: line-item complexType
- 206: shipper complexType

*Figure 2*

```
/*
 *
 * XML Type: customer
 * Namespace: http://openuri.org/easypo
 * Java type: org.openuri.easypo.Customer
 *
 * Automatically generated - do not modify.
 */
package org.openuri.easypo;

/**
 * An XML customer(@http://openuri.org/easypo).
 *
 * This is a complex
 */
@com.bea.annotation.xmlbinding.XMLBindingProvenance {
   schemaTypeName("schema1.customer");
}
public interface Customer extends org.apache.xmlbeans.XmlObject
{

/**
     * Gets the "name" element
     */
    @com.bea.annotation.xmlbinding.XMLBindingMethodProvenance {
       type("Java"),
       operation("get"),
       schemaComponent("customer.name")
    }
    java.lang.String getName();

/**
     * Gets (as xml) the "name" element
     */
    @com.bea.annotation.xmlbinding.XMLBindingMethodProvenance {
       type("XMLBean"),
       operation("get"),
       schemaComponent("customer.name")
    }
    org.apache.xmlbeans.XmlString xgetName();

/**
     * Sets the "name" element
     */
    @com.bea.annotation.xmlbinding.XMLBindingMethodProvenance {
       type("Java"),
       operation("set"),
       schemaComponent("customer.name")
    }
    void setName(java.lang.String name);

/**
     * Sets (as xml) the "name" element
     */
    @com.bea.annotation.xmlbinding.XMLBindingMethodProvenance {
       type("XMLBean"),
       operation("set"),
       schemaComponent("customer.name")
    }
    void xsetName(org.apache.xmlbeans.XmlString name);
}
```

300 — interface declaration block
302 — getName()
304 — xgetName()
306 — setName()
308 — xsetName()

*Figure 3*

ANNOTATIONS FOR TRACKING PROVENANCE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present disclosure relates generally to a means for relating any two documents and, more particularly, a means for using programming language annotations to perpetuate the provenance of generated source code artifacts.

BACKGROUND

Software tools for generating source code from a high-level description simplify software development by allowing a programmer to focus on the high-level description rather having to write the complex, generated code themselves. A drawback of such systems is that generated code often bears little or no resemblance to the high-level description. This makes it unintuitive for programmers to incorporate the generated code into their projects. The cryptic nature of generated code can be alleviated somewhat by the automatic insertion of comment text. But while comments may aid readability of the generated code to some extent, a programmer writing software that depends on the generated code will need to frequently examine the high-level description and the generated code in the course of writing the dependent code. Having to repeatedly switch back and forth between documents can cause programmers to lose their focus. Gains in productivity made by automatically generating source code can be mitigated by the cumbersome nature in which it is used. Accordingly, what is needed is a way to enrich interactive tools and software development environments with knowledge of the relationships between documents such that programmers will not lose their context when working with generated code.

BRIEF DESCRIPTION OF THE DRAWINGS

FIG. 2 shows an XML schema in accordance to an embodiment.

FIG. 3 shows language bindings generated for the customer element defined in the schema of FIG. 2 in accordance to an embodiment.

DETAILED DESCRIPTION

Figure 1A:
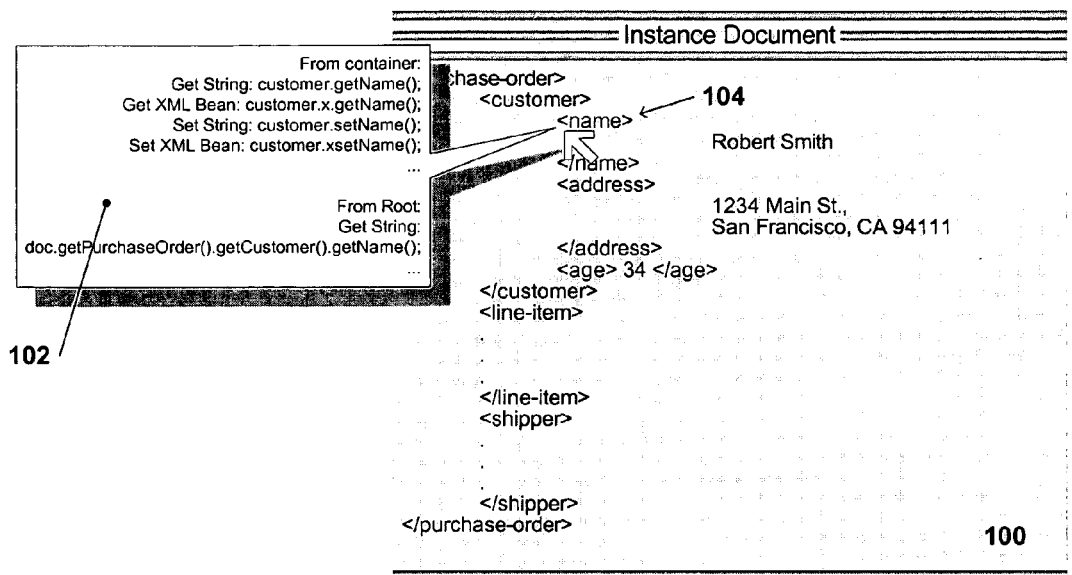
FIGS. 1a and 1b illustrate a graphical user interface for an interactive editor in accordance to an embodiment.

The invention is illustrated by way of example and not by way of limitation in the figures of the accompanying drawings in which like references indicate similar items. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to one skilled in the art that the invention may be practiced without these specific details. In other instances, well-known features have not been described in detail so as not to obscure the invention.

Examples are given in terms of Java® and eXtensible Markup Language (XML), however those of skill in the art will recognize that the teachings herein are applicable to relating documents of any kind, not merely those illustrated. Likewise, while interactive software development tools can be enriched by using provenance information to spur the software development process, the teachings herein are naturally applicable to many disciplines which are fully within the scope and spirit of the present disclosure. (The Java® platform and programming language are available from Sun Microsystems, Inc. Java® is a registered trademark of Sun Microsystems, Inc.)

In various embodiments, a first document called an artifact document (or "artifact") is related to a second document called a schema document (or "schema"). In one embodiment, the artifact is automatically generated based on information in the schema. For example, an XML schema can be used to generate XMLBeans, a YACC (Yet Another Compiler Compiler) grammar can be used to generate a C language parser, etc. In another embodiment, the artifact and the schema document simply share a logical relationship based on their syntax and/or semantics. In yet a further embodiment, a relationship between the artifact and the schema document is established by the content in one or both. The term document is used in the most general sense and can include (but is not limited to) any of the following: an XML schema/instance document (or portions thereof), Java® source code, source code in at least one programming language, text, a description of a graphical representation, a file and a portion of a file. One or more portions (or "items") of an artifact are annotated with provenance information which can be used by automatic and/or interactive tools for locating related items in the schema, the artifact and other documents.

One embodiment will be illustrated using XMLBeans, which is software available from the Apache Software Foundation XML Project (http://xml.apache.org/). XMLBeans can be used to provide a Java® object-based view of XML data through which a programmer can access XML in a Java®-friendly way. An XMLBeans tool compiles an XML schema into artifacts which are Java® language bindings that can be used to create, access and modify XML instance data. In various embodiments, the language bindings are annotated with provenance information. In one embodiment, a provenance annotation conforms to JSR 175 (Java® Specification Request 175: A Metadata Facility for the Java® Programming Language).

Figure 1B:
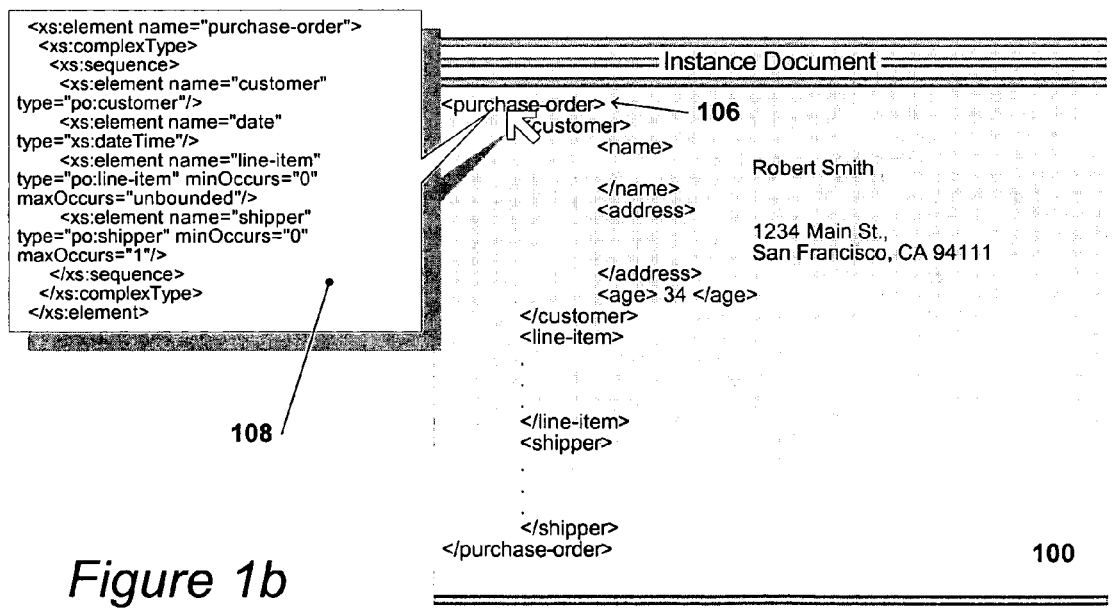

FIGS. 1a and 1b illustrate a graphical user interface for an interactive source code editor in accordance to various embodiments. An interactive editing pane 100 can be used for composing and editing documents. In aspects of these embodiments, the editor can be part of a larger Integrated Development Environment (IDE). In another embodiment (not shown), the editing pane could allow a user to compose and edit a program by manipulation of graphical symbols representing program logic and control flow. A user can select an item in the pane with an input device such as (but not limited to) a computer mouse. The movement of the mouse on a physical surface is translated to movement of a graphical pointer symbol (e.g., an arrow) across the editing pane.

In one embodiment, the editing pane provides a view of an XML instance document which can contain data that conforms to the shape of an associated XML schema. In FIG. 1a, the mouse pointer is positioned in proximity to the name item 104. In one embodiment, allowing the mouse pointer to dwell for a short period of time near or over an item—or otherwise selecting an item—allows the user to view the corresponding XMLBean accessors in the artifact in a pop-up window or other display. The user can cause the pop-up window to appear by way of a mouse gesture, allowing the mouse pointer to dwell on or near an item, a menu selection, a key press, or other indication to the user interface. In this example, a pop-up window 102 provides a view of accessor methods in the artifact needed to programmatically access the value of the name item in a XMLBean. By way of example, accessors for each container level are shown. In one embodiment, information in the pop-up window can also be filtered. In aspects of these embodiments, the user interface can enable the user to copy text from the pop-up window and paste it into one or more editing panes. In further aspects, selection of an accessor in the pop-up window will cause the activation of an editing pane for the accessor.

The editing pane in FIG. 1b contains an instance document as discussed in relation to FIG. 1a. However, in this illustration the purchase-order 106 item has been selected. In addition to viewing accessors associated with an item in the instance document, a user can view the associated XML schema definition (e.g., by way of a mouse gesture, allowing the mouse pointer to dwell on or near an item, a menu selection, a key press, or other indication to the user interface). In this example, the schema definition for purchase order is shown in the pop-up window 108. In one embodiment, information in the pop-up window can also be filtered. In aspects of these embodiments, the user interface can enable the user to copy text from the pop-up window and paste it into one or more editing panes. In further aspects, selection of an accessor in the pop-up window which will cause the activation of an editing pane for the schema.

In one embodiment, the interactive editing pane of FIGS. 1a and 1b can also provide a view of the schema or the artifact. In yet another embodiment, allowing the mouse pointer to dwell near or over an item—or otherwise selecting an item—allows the user to view the corresponding uses of that item in other documents via a pop-up window or similar display as described above. For example, if the item selected is an element in the schema or a language binding in the artifact, the pop-up window (not shown) would show the uses of the language binding (e.g., class/interface declarations, method invocations, etc.) in instance and/or other documents. As described above, information in the pop-up window can be filtered, copied and/or selected. In one embodiment, selection of a "use" in the pop-up window will cause the activation of an editing pane for the document containing the use.

Although FIG. 1 illustrates a graphical user interface, a user interface is not limited to such and can include one or more of the following: an ability to respond to sounds and/or voice commands; an ability to respond to input from a remote control device (e.g., a cellular telephone, a PDA, or other suitable remote control); an ability to respond to gestures (e.g., facial and otherwise); an ability to respond to commands from a process on the same or another computing device; and an ability to respond to input from a computer mouse and/or keyboard. This disclosure is not limited to any particular user interface. Those of skill in the art will recognize that many other user interfaces presently known and yet to be developed are possible and fully within the scope and spirit of this disclosure.

Some of the capabilities described above are made possible through annotation of the artifact with provenance information. By way of illustration, FIG. 2 shows an XML schema in accordance to an embodiment. An XML schema describes the structure of a valid XML instance document. Document segment 200 defines the top-level element purchase-order as containing the following elements: customer, date, line-item and shipper. The customer, line-item and shipper elements are likewise defined in document segments 202, 204 and 206, respectively. For example, a customer defines elements for name, address, and age.

FIG. 3 shows language bindings automatically generated for the customer element defined in the schema of FIG. 2. The bindings include provenance annotations which are shown in bold. Document segment 300 consists of the Customer interface, which corresponds to the customer element 202 in the schema. The Customer interface is annotated with an automatically generated XMLBindingProvenance annotation which in one embodiment is defined as follows:

```
@Retention(RetentionPolicy.RUNTIME)
@Target(ElementType.CLASS)
public @interface XMLBindingProvenance {
    String schemaTypeName( );
}
```

The @Retention(RetentionPolicy.RUNTIME) annotation specifies that XMLBindingProvenance annotations will be available in the Java® virtual machine at run time, so they may be read reflectively. The @Target(ElementType.CLASS) annotation indicates that XMLBindingProvenance annotations are only to appear on class/interface definitions. Finally, the schemaTypeName is the parameter specified for the XMLBindingProvenance annotation and serves as a reference back to the definition of customer in the schema. In this case, the string "schema1.customer" has been provided as the schemaTypeName, which assumes that the schema is identified as "schema1" at runtime. As will be explained below, the XMLBindingProvenance annotation can be processed by an annotation processor to create a compile-time or run-time accessible association between the Customer interface definition and the customer schema element.

In document segments 302-308, XMLBean accessor methods are defined for the customer name schema element. Each includes an automatically generated XMLBindingMethodProvenance annotation shown in bold. In one embodiment, the annotation can be defined as follows:

```
@Target(ElementType.METHOD)
public @interface XMLBindingMethodProvenance {
    String type( );
    String operation( );
    String schemaComponent( );
}
```

The @Target(ElementType.METHOD) annotation indicates that XMLBindingMethodProvenance annotations are only to accompany method definitions. The type parameter indicates whether the accessor method is for a Java® type or an XMLBean type. The operation parameter indicates whether the accessor method is a getter or a setter of a value. Finally, the schemaComponent parameter serves as a reference back to the definition of the name element in the schema. In one embodiment, the schemaComponent parameter can serve as a search key into a schema type method map which can be built by an annotation processor as discussed below. In this illustration, the getName method defined in document segment 302 has an accompanying XMLBindingMethodProvenance annotation specifying that it is a Java® type method, that it gets rather than sets a value, and that its schema element name is "customer.name".

Provenance annotations in the most general sense merely refer to an item in another document, thereby forming an association with the annotated item and the item referred to. Those of skill in the art will appreciate that this disclosure is not limited to the illustrated means of expressing annotations and that other annotation forms are fully within the scope and spirit of the present disclosure.

Figure 4:
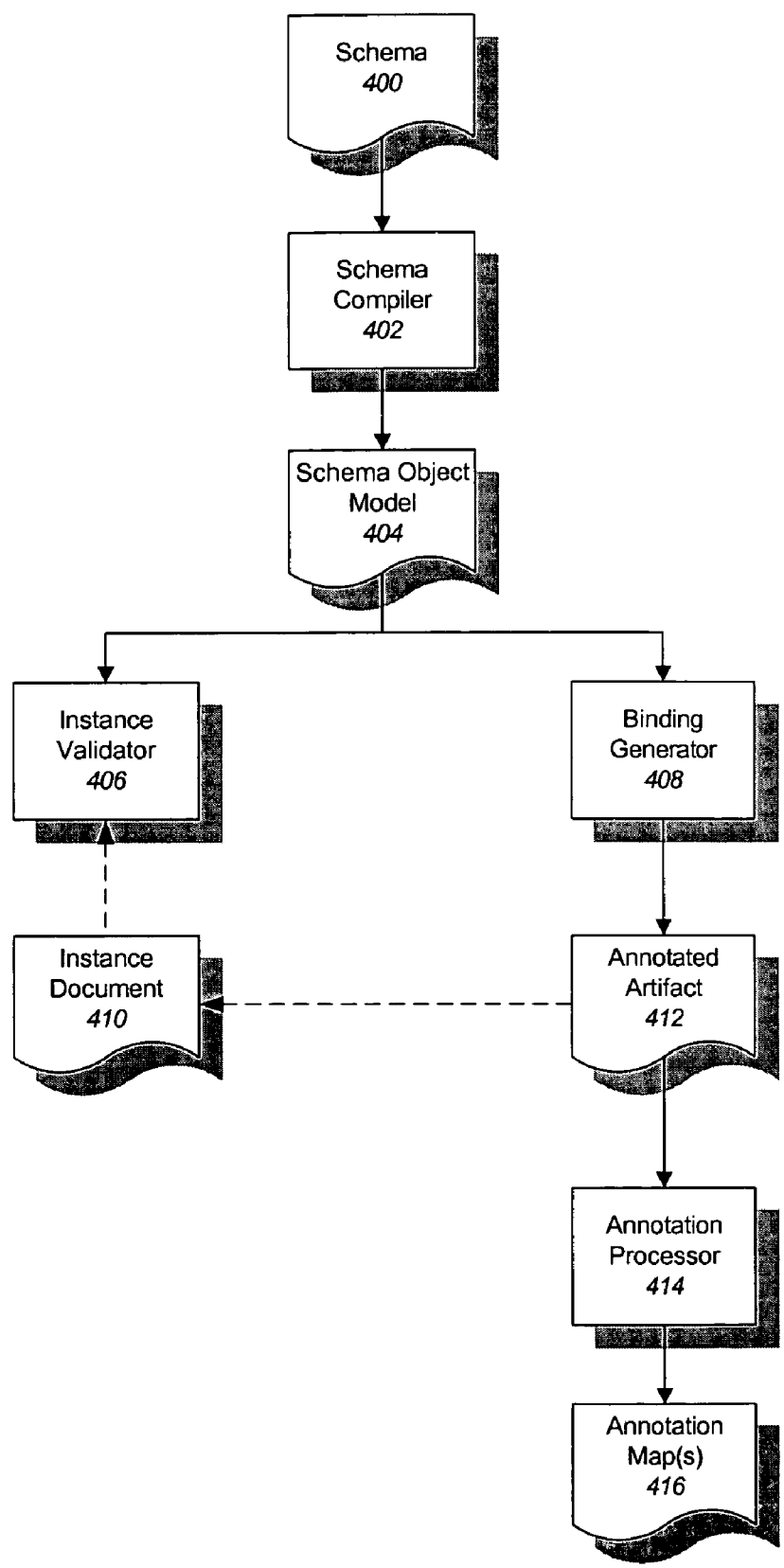
FIG. 4 is an illustration of process flow in accordance to an embodiment.

FIG. 4 is an illustration of process flow in accordance to an embodiment. Although this figure depicts processing in a particular order for purposes of illustration, one skilled in the art will appreciate that various processes portrayed in this figure can be omitted, rearranged, performed in parallel, combined and/or adapted in various ways. A schema document 400 defines the valid structure of instance document 410. Schema compiler 402 translates the schema document into a programming language-agnostic schema object model 404. Binding generator 408 translates the schema object model to provenance-annotated Java® programming language bindings 412 wherein the annotations refer back to the schema. It will be appreciated by those of skill in the art that the language neutral schema object model can be bound to any number of programming languages and still be fully within the scope and spirit of the present disclosure. In one embodiment, the binding generator is a modified version of the XMLBeans tool. In another embodiment, the binding generator can be implemented using a lexical analyzer and parser generated by off-the-shelf tools (e.g., Lex and YACC), as are well known in the art. By way of further illustration, the schema compiler and the binding generator can be implemented using XBeans. (An XBean is a software component that accepts XML as input and performs some processing on it.)

Figure 5:
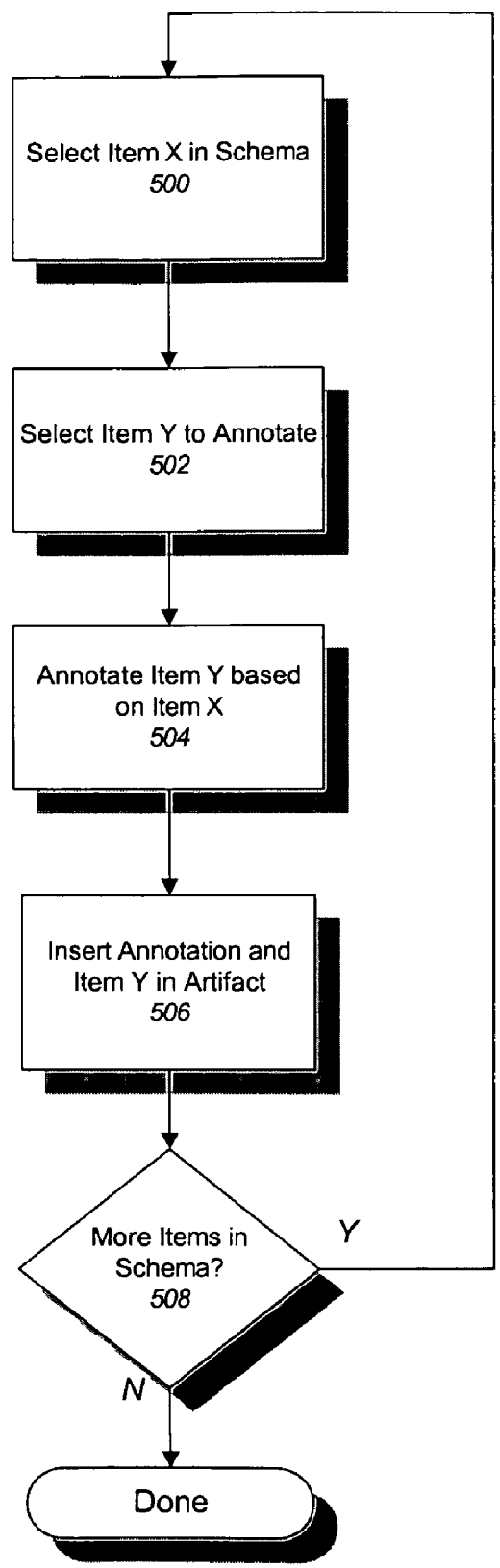
FIG. 5 is a flow diagram illustration of language binding generation in accordance to an embodiment.

FIG. 5 is a flow diagram illustration of a binding generator. Although this figure depicts functional steps in a particular order for purposes of illustration, one skilled in the art will appreciate that the various steps portrayed in this figure can be omitted, rearranged, performed in parallel, combined and/or adapted in various ways. At block 500, an item X is selected from an instance document. For example, items can be selected sequentially starting at the beginning of the instance document. In one embodiment, an item in the instance document is an XML schema element. At block 502, an item Y is selected for annotation. In one embodiment, selecting item Y comprises generating Y based on X. For example, item Y can be the Java® language binding for item X. A provenance annotation for item Y is determined in block 504 wherein the annotation refers back to item X. The annotation and item Y are inserted into an artifact at block 506. If there are more items to select in the schema (block 508), the process continues at block 500. Otherwise, the process completes.

Referring again to FIG. 4, in one embodiment, the schema object model can be used by instance validator 406 to validate whether the instance document conforms to the schema. For example, the validator may verify that the structure of the instance document is correct and that the data occurring in the instance document is of the appropriate type. In aspects of these embodiments, the instance document validator can be implemented as an XBean. One such validator is available from the Apache XML project (http://xml.apache.org). In aspects of these embodiments and by way of illustration, language bindings for complex types in the schema can have factories associated with them. A type's factory can be used to create instances of the type which can be serialized to an XML instance document. In yet another aspect, the instance document can be created by hand. If the instance document is generated programmatically (e.g., by serialization), validation may not be required.

Figure 6:
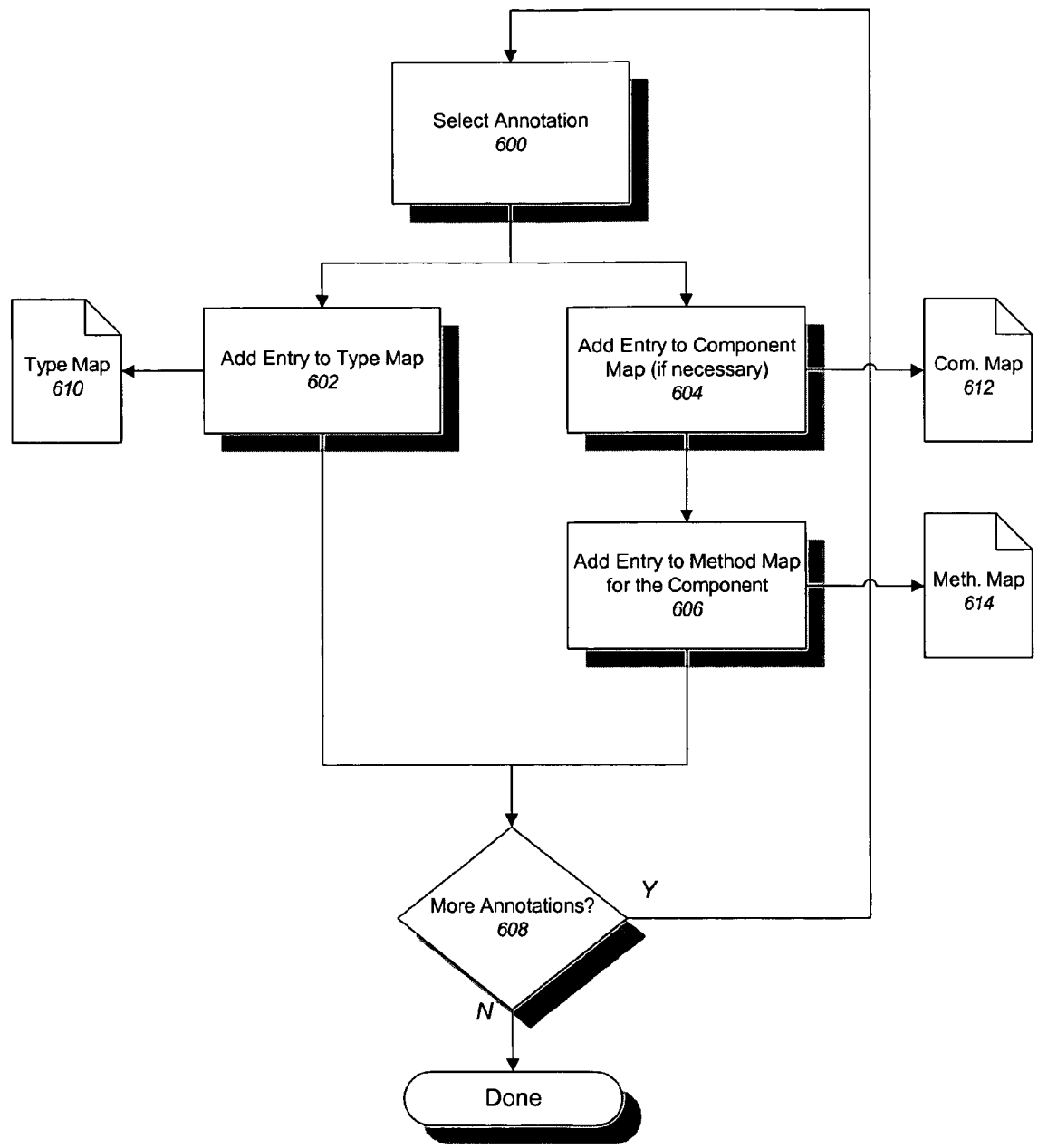
FIG. 6 is a flow diagram illustration of annotation processing in accordance to an embodiment.

In one embodiment, each annotation type has an associated annotation processor 414 which creates one or more annotations maps 416 which can be used to enrich interactive and/or automatic software development tools. In aspects of these embodiments, an annotation map contains one or more associations between the schema and the artifact. FIG. 6 is a flow diagram of annotation processing in accordance to an embodiment. Block 600 selects an annotation from an artifact. For example, annotations can be selected sequentially starting at the beginning of the artifact document. If the annotation is an XMLBindingProvenance, then an entry is added to a provenance type map 610 for the annotation (block 602). For example, the entry would be an association between a schema type name and a fully qualified Java® type name. If the annotation is an XMLBindingMethodProvenance, then an entry is added to a provenance component map 612 if one does not already exist (block 604). Again, the entry could be an association between a schema component name and a fully qualified Java® method name. In block 606, an entry is added to a provenance method map 614 for the component wherein the mapping is between the method type (e.g., Java® and XML), operation (e.g., set and get) and a fully qualified Java® method name. At block 608 it is determined whether or not there are more annotations to process in the schema. If so, processing continues at block 600. Otherwise, processing terminates. A process such as an interactive editor can use the type, component and method maps for performing error checking, code completion and providing contextual pop-ups. Contextual viewing was discussed above in relation to FIGS. 1*a*-1*b*. Techniques for type checking and interactive auto-completion are well known in the art will not be discussed here in order to avoid obscuring the disclosure.

Figure 7:
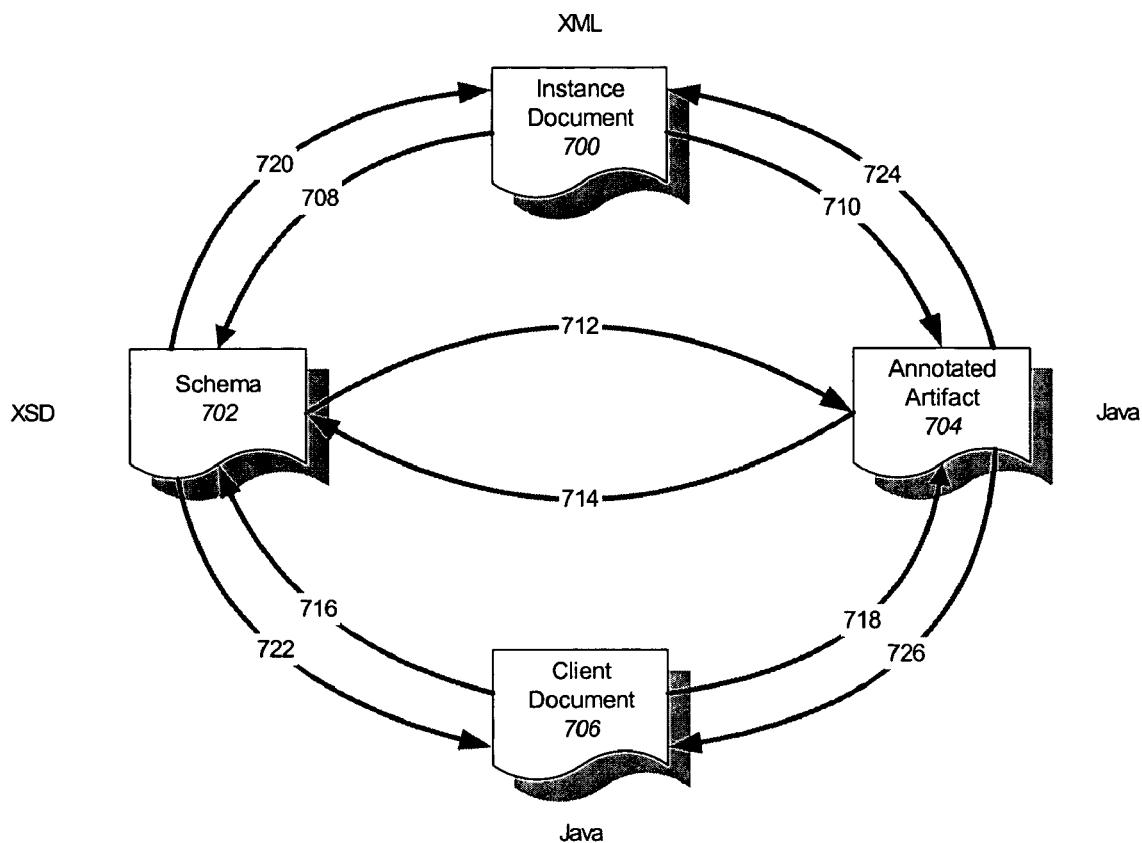
FIG. 7 is an illustration of how provenance annotation maps can be used to create relationships between documents.

FIG. 7 is an illustration of how provenance maps can be used to create relationships between documents. This diagram includes an instance document 700, schema 702, annotated artifact 704 and a client document 706. The client document includes Java® code written by a user wherein the code depends on the annotated artifact. After one or more annotation processors have run, there exists provenance maps as described in relation to FIG. 6. These maps can be used by interactive software tools to enrich the user experience by intuitively providing information and navigation capability among the documents in FIG. 7. For example, assuming the instance document was decorated with the schema types each XML statement referred to, a given item in the instance document can be mapped 708 to its schema definition and its accessor methods 710 using the type/component and method provenance maps, respectively. Likewise, a reference to an artifact in the client document can be mapped to accessors 718 in the artifact through the method map, or the reference can be mapped to the schema definition 716 via the type or component provenance maps. Finally, elements in the schema itself can be mapped to accessors in the artifact 712 (and vice versa 714) through one or more of the provenance maps.

In yet a further embodiment and with reference to FIG. 7, it is possible to locate all uses of schema definitions in instance or client documents. For example, an identifier for a schema element can be converted into its equivalent language binding identifier through a provenance map. The language binding identifier can then be searched for in the instance (720) or client documents (722) to yield uses thereof. Likewise, uses of language binding identifiers in the annotated artifact can be found similarly by searching for occurrences of the identifiers in the instance (724) or client documents (726).

In one embodiment, the system has the ability to refactor document contents that derive from or depend on the schema in order to maintain consistency with the schema when it is changed. Refactoring is a well known technique for modifying source code without changing the run-time behavior of the source code. In aspects of this embodiment, when a change occurs in the schema, this change can be automatically propagated to all related documents. By way of illustration, if a schema element is renamed, promoted or demoted, references to it will be likewise modified in language bindings, provenance annotations, instance documents and other documents. In yet a further embodiment, the system has the ability to update the type, component and method maps to reflect changes to the schema.

Figure 8:
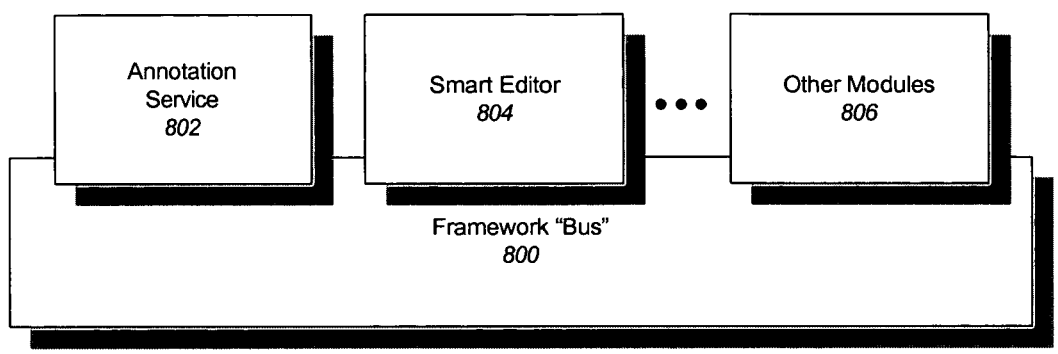
FIG. 8 is an illustration of an interactive software development environment in which various embodiments can be practiced.

FIG. 8 is an illustration of an extensible IDE software framework in an embodiment. The IDE framework includes a logical framework "bus" 800 into which framework software modules can integrate themselves into the IDE. In one embodiment, modules implement a programmatic interface and/or a protocol that is compatible with the bus. Through the bus, modules can advertise their services and dynamically discover the services of others. One such extensible IDE is WebLogic® Workshop, available from BEA Systems, Inc. (WebLogic® is a trademark of BEA Systems, Inc.) For example, an annotation service 802 can provide annotation mapping functionality to other modules as previously described. A smart editor module 804 can offer document editing services to other modules and take advantage of the mapping functionality in the annotation module to enrich the programmer's editing experience as described above.

Although a diagram may depict components as logically separate, such depiction is merely for illustrative purposes. It will be apparent to those skilled in the art that the components portrayed can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

Various embodiments may be implemented using a conventional general purpose or specialized digital computer(s) and/or processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of conventional component circuits, as will be readily apparent to those skilled in the art.

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for automatically relating documents, comprising:
   selecting a first item in a first document that is associated with a first document type;
   selecting a second item wherein the second item is related to the first item;
   annotating the second item in a second document that is associated with a second document type with an annotation, wherein the annotation refers to the first item, and wherein the annotation comprises provenance information that includes association between the first item in the first document type and the second item in the second document type;
   creating annotation maps that enable an interactive editor to provide error checking, code completion, and contextual viewing, wherein each annotation map contains one or more associations between an item in the first document and an annotated item in the second document; and
   adding an entry for a new association for the annotation in a selected annotation map based on an annotation type of the annotation.

2. The method of claim 1 wherein: a document is at least one of: an XML schema document, an XML instance document, Java source code, source code in at least one programming language, text, a description of a graphical representation, a file and a portion of a file.

3. The method of claim 1 wherein: the annotation includes information which is used to locate the first item.

4. The method of claim 1 wherein: the annotation is a Java programming language annotation.

5. The method of claim 1 wherein: an item is a portion of a document.

6. The method of claim 1 wherein: the first item is an XML schema element.

7. The method of claim 1 wherein the step of selecting the second item comprises: generating the second item based on the first item.

8. The method of claim 1 wherein: the first document is an XML schema document and the second document includes a programming language representation of the first document.

9. The method of claim 1 wherein: the second item is a programming language binding of the first item.

10. The method of claim 1, further comprising: yielding the first item when the second item is selected.

11. The method of claim 1, further comprising: yielding the second item when the first item is selected.

12. The method of claim 1, further comprising: yielding one of: the first item and the second item when a third item in a third document is selected.

13. The method of claim 1, further comprising: yielding uses of the second item in a third document.

14. The method of claim 1, further comprising: refactoring one of: the second document and a third document when the first document is changed.

15. The method of claim 1 wherein:
the provenance information provides a compile-time or run-time accessible association between the first item and the second item, wherein the first document is an XML schema document and the second document includes a programming language representation of the first document.

16. The method according to claim 1, wherein the annotation maps include a provenance type map, a provenance component map, and a provenance method map for the component.

17. A machine readable medium having instructions stored thereon to cause a system to:
select a first item in a first document that is associated with a first document type;
select a second item wherein the second item is related to the first item;
annotate the second item in a second document that is associated with a second document type with an annotation and wherein the annotation refers to the first item, wherein the annotation comprises provenance information that includes association between the first item in the first document type and the second item in the second document type;
create annotation maps that enable an interactive editor to provide error checking, code completion, and contextual viewing, wherein each annotation map contains one or more associations between an item in the first document and an annotated item in the second document; and
adding an entry for a new association for the annotation in a selected annotation map based on an annotation type of the annotation.

18. The machine readable medium of claim 17, further comprising instructions to cause the system to: generate the second item based on the first item.

19. The machine readable medium of claim 17, further comprising instructions to cause the system to: yield the first item when the second item is selected.

20. The machine readable medium of claim 17, further comprising instructions to cause the system to: yield the second item when the first item is selected.

21. The machine readable medium of claim 17, further comprising instructions to cause the system to: yield one of: the first item and the second item when a third item in a third document is selected.

22. The machine readable medium of claim 17, further comprising instructions to cause the system to: yield uses of the second item in a third document.

23. The machine readable medium of claim 17, further comprising instructions to cause the system to:
refactor one of: the second document and a third document when the first document is changed.

24. The machine readable medium according to claim 17, wherein the annotation maps include a provenance type map, a provenance component map, and a provenance method map for the component.

25. A method for using programming language annotations to perpetuate the provenance of generated source code artifacts, comprising:
defining via a schema document a valid structure of an instance document;
translating the schema document into a schema object model, wherein the schema object model is programming language-agnostic;
translating the schema object model to provenance-annotated programming language bindings, wherein the annotations used in provenance-annotated programming language bindings refer back to one or more schema within the schema document;
inserting the annotations in an artifact; and
creating one or more annotation maps to enrich interactive and/or automatic software development tools, wherein each annotation map contains one or more associations between a schema and an annotation in the artifact.

26. The method according to claim 25, further comprising:
using the schema object model to validate whether the instance document conforms to the schema.

* * * * *

UNITED STATES PATENT AND TRADEMARK OFFICE
CERTIFICATE OF CORRECTION

PATENT NO. : 7,610,545 B2 Page 1 of 1
APPLICATION NO. : 11/145605
DATED : October 27, 2009
INVENTOR(S) : Wagner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 532 days.

Signed and Sealed this

Twelfth Day of October, 2010

David J. Kappos
*Director of the United States Patent and Trademark Office*